Feb. 11, 1969  W. JÖRES  3,426,633
SHEET CUTTING DEVICE

INVENTOR.
Willi Jöres

United States Patent Office

3,426,633
Patented Feb. 11, 1969

3,426,633
SHEET CUTTING DEVICE
Willi Jöres, Leverkusen, Germany, assignor to AGFA-Gevaert Aktiengesellschaft, Leverkusen, Germany, a corporation of Germany
Filed Jan. 6, 1966, Ser. No. 519,088
Claims priority, application Germany, Jan. 12, 1965, A 48,452
U.S. Cl. 83—341
Int. Cl. B23d 25/00; B26d 5/20
4 Claims

ABSTRACT OF THE DISCLOSURE

Sheet cutting device for cutting a continuously conveyed sheet by a cutting blade which is mounted on a rotating shaft to avoid damming of said sheet at said blade. The upper surface of said blade is inclined to the plane of said sheet in direction of the travel of said sheet at an angle at least equal to an angle the tan of which equals the velocity of said sheet divided by the velocity of said blade. Preferably, said blade is sickle-shaped. Furthermore, said blade may intersect the plane of said sheet at an angle deviating from the normal with respect to the direction of travel of said sheet to cut said sheet at a right angle.

---

Figure 1:
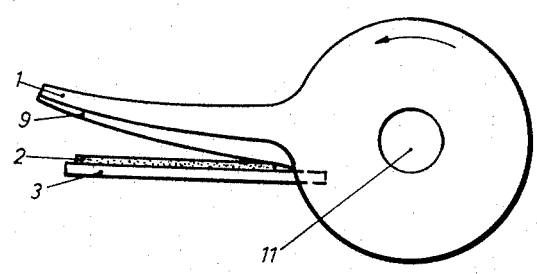

This invention relates to a guillotine for cutting material in web form, which comprises an upper blade consisting of a rotating disc with at least one sickle-shaped blade projecting in the direction of the plane surfaces of the disc.

Guillotines are known in which the web of material is cut while stationary with a conventional crossblade. This means that the web of material has to be moved forwards by a distance corresponding to the length to be cut, stopped and then cut. The disadvantage of these continuous guillotines is that the advance of the web of material involves the acceleration and deceleration of considerable masses both of the material and of the guillotine itself. As a result, format lengths of unequal size, so-called uneven cuts are obtained. In addition, the guillotine has a low output.

In addition, so-called oscillating guillotines are known in which a reciprocating beam carrying one lower and one upper blade cuts the material moving at an even rate as it oscillates about a central position. In this type of guillotine, both the reciprocating beam and the upper blade are driven by cam plates. Consequently, the guillotine has only a relatively low output and, in addition, the cams wear relatively quickly which results in inaccurate cutting and involves frequent repairs.

In addition, guillotines are known with a blade rotating about its longitudinal axis and cutting the web of material moving at an even rate as it rotates. The disadvantage of this guillotine is that the web of material is not cut perpendicularly, but always at an acute angle relative to its depth.

Finally, there are guillotines, so-called chopping machines, in which a sickle-shaped upper blade is anchored to a disc. This machine is not suitable for cutting webs of material moving at an even rate because the shape of the sickle-shaped blade does not permit this.

These disadvantages can be obviated if, in accordance with the invention, the plane surfaces of the blade are inclined at an acute angle relative to the direction in which the web of material travels. In this way, interruption of the advance of the web of material as it is being cut is avoided. In addition the blade unit as a whole is inclined from the perpendicular relative to the edge of the web in such a way that the cutting end of the blade lies in the direction of travel of the web so that square cuts are obtained. The angle at which the blade unit is inclined is governed by the format length to be cut.

The transverse forces which are set up during cutting transversely of the direction in which the web of material travels and which displace the web out of the cutting area, are compensated by arranging the fulcrum of the upper blade over the plane of the web. The roller feeding the web of material and the rotating upper blade are coupled directly by gear wheels or by a gear system so that the lengths of material cut off are always of the same length. In addition, the cutting power may be readily increased to almost any desired extent by altering the speed of rotation. The format lengths to be cut may be readily altered by changing the ratio between the rotational speed of the upper blade and that of the feed roller and at the same time adjusting the angle of inclination of the blade unit to the new format length. By arranging the cross-blade in this way the cutting parts of the machine do not reciprocate, but rotate at a uniform speed.

It is possible with the guillotine according to the invention to increase cutting efficiency very considerably whilst maintaining the same quality and to obtain a greater cutting accuracy and to reduce manufacturing and maintenance costs in comparison with the known arrangements.

The guillotine according to the invention is illustrated in the accompanying drawings in which FIG. 1 shows the sickle-shaped cutting edge of the upper blade as it cuts through the web of material. FIG. 1 also shows the arrangement of the bearing or mounting for the upper blade above the plane of the web of material.

Figure 2:
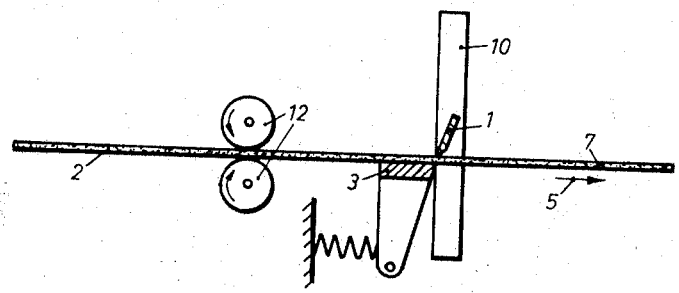

FIG. 2 shows the rollers feeding the web of material, the spring-mounted lower blade and the blades cutting through the material.

Figure 3:
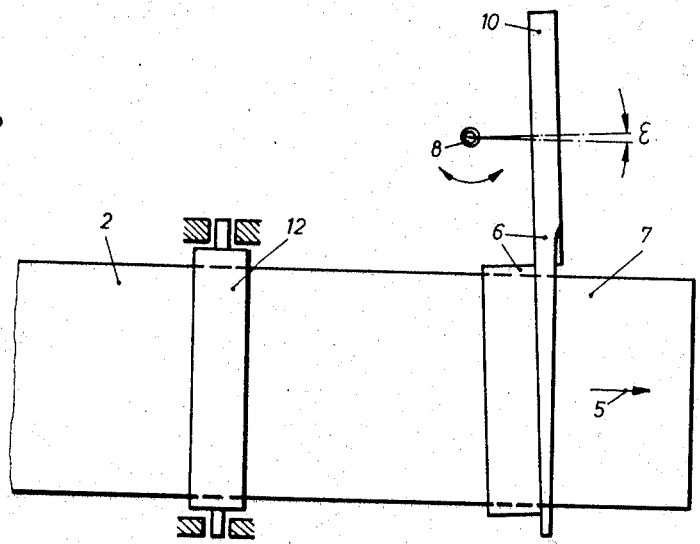
Figure 4:
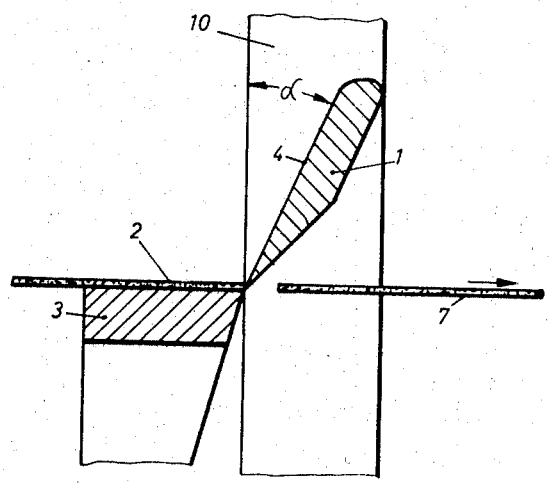

FIG. 3 shows the direction in which the web of material travels, the feed rollers and the angle of inclination of the blade unit. FIG. 4 shows the blade cutting through the material on a larger scale than does FIG. 2. This figure also shows how the cutting edge of the upper blade terminates at a smooth surface.

The shape of the cutting edge 9 of the curved upper blade 1 is a spiral, corresponding to the law of motion. It arises out of the increasing peripheral speed of the cutting edge 9 with increasing radius, the uniform rate of advance of the web material 2 and the uniform cutting speed resulting from it due to the required straight cut. In addition, the plane surface 4 of the upper blade 1 is tilted in the direction of travel 5 of the web of material 2. The angle $\alpha$ of the tilted or inclined surface 4 is determined by the speed at which the web of material moves, the angular velocity of the upper blade, the number of upper blades 1 and the width of the web. In FIG. 3, the blade unit as a whole is shown rotated through the angle $\xi$ about the point 8 relative to the vertical edge of the web. The cutting edge 9 of the curved upper blade 1 terminates in a smooth circular surface 10. During rotation of the upper blade 1, the surface 10 is always in contact with the spring-mounted lower blade 3, and, as a result guides the blades 1 and 3 with complete accuracy. The bearing 11 for the upper blade 1 is mounted above the plane of the web. The feed rollers 12 and the upper blade 1 are coupled by the direct interengagement of gear wheels so that equal format lengths 7 are formed as each cut is completed.

I claim:
1. A sheet cutting device comprising means defining a cutting station, means for continuously conveying a sheet of material to be cut past said cutting station at a predetermined velocity, a cutting blade, means for moving said cutting blade at a predetermined velocity in cutting engagement with said sheet of material in a direction transverse to the conveying direction of said sheet, spring biased ledger blade means comparatively associated with said cutting blade, wherein the surface of the cutting blade faces in the direction of travel of said sheet and said surface is inclined to the plane of said sheet at an angle at least equal to the angle of the tangent which equals the velocity of the sheet divided by the velocity of the blade.

2. Sheet cutting device according to claim 1 in which the blade is shaped and positioned to make progressively cutting contact with the sheet crossing transverse thereto.

3. Sheet cutting device according to claim 2 wherein the blade has a sickle-shaped edge.

4. Sheet cutting device according to claim 3, wherein the plane of movement of the blade intersects the plane of the sheet at an angle deviating from the normal with respect to the direction of travel of the sheet whereby the sheet is cut at right angles.

References Cited

UNITED STATES PATENTS

| 1,484,262 | 2/1924 | Grodin | 83—592 X |
|---|---|---|---|
| 1,851,334 | 3/1932 | Stein et al. | 83—355 X |
| 2,143,252 | 1/1939 | Von Kohorn Zu Kornegg | 83—591 |
| 2,753,000 | 7/1956 | Marek | 83—596 |
| 658,059 | 9/1900 | Du Brul | 146—109 X |
| 2,115,234 | 4/1938 | Preston | 146—109 |

FOREIGN PATENTS 477,536   6/1929   Germany.

JAMES M. MEISTER, *Primary Examiner.*

U.S. Cl. X.R.

83—355, 583, 592